(12) United States Patent
Ranalli et al.

(10) Patent No.: US 10,630,119 B2
(45) Date of Patent: Apr. 21, 2020

(54) ELECTRIC MOTOR, IN PARTICULAR FOR FANS FOR COMBUSTION AIR, OR FOR AN AIR/COMBUSTION GAS MIXTURE, IN GAS BURNERS, STATOR ASSEMBLY FOR SUCH ELECTRIC MOTOR, AND METHOD OF ASSEMBLY FOR SUCH STATOR ASSEMBLY

(71) Applicant: SIT S.P.A., Padua (IT)

(72) Inventors: Antonio Ranalli, Montefano (IT); Paolo Mazzieri, Osimo (IT)

(73) Assignee: SIT S.P.A., Padua (IT)

( * ) Notice: Subject to any disclaimer, the term of this patent is extended or adjusted under 35 U.S.C. 154(b) by 21 days.

(21) Appl. No.: 16/076,993

(22) PCT Filed: Feb. 21, 2017

(86) PCT No.: PCT/EP2017/053936
§ 371 (c)(1),
(2) Date: Aug. 9, 2018

(87) PCT Pub. No.: WO2017/144464
PCT Pub. Date: Aug. 31, 2017

(65) Prior Publication Data
US 2019/0052132 A1 Feb. 14, 2019

(30) Foreign Application Priority Data
Feb. 22, 2016 (IT) .................. 102016000017691

(51) Int. Cl.
*H02K 1/14* (2006.01)
*H02K 3/52* (2006.01)
(Continued)

(52) U.S. Cl.
CPC ............ *H02K 1/148* (2013.01); *H02K 3/522* (2013.01); *H02K 5/08* (2013.01); *H02K 5/15* (2013.01);
(Continued)

(58) Field of Classification Search
USPC ......................... 310/179, 180, 183
See application file for complete search history.

(56) References Cited

U.S. PATENT DOCUMENTS 3,061,746 A * 10/1962 Hansen ................. H02K 17/10
310/90
3,709,457 A * 1/1973 Church .................. H01F 41/12
249/91
(Continued)

FOREIGN PATENT DOCUMENTS

EP 1760861 A1 3/2007
EP 2006976 A1 12/2008
(Continued)

OTHER PUBLICATIONS

International Search Report dated Apr. 28, 2017 re: Application No. PCT/EP2017/053936, pp. 1-3.
(Continued)

*Primary Examiner* — Jermele M Hollington
*Assistant Examiner* — Rashad H Johnson
(74) *Attorney, Agent, or Firm* — Cantor Colburn LLP

(57) ABSTRACT

An electric motor, particularly for fans for combustion air, or for an air/combustion gas mixture, in gas burners, includes a stator assembly, which in turn includes a lamination pack provided with a perimetric frame with at least one pair of pole shoes, each one of which is constituted by a winding body and an expanded head; a frame for supporting the lamination pack; and a spool of conducting wire for each pole shoe, with the interposition of an insulating support. The assembly further includes elements for reducing rotational friction, for the driving shaft of a rotor, and accommodation parts for the elements for reducing rotational friction. The motor also includes a rotor with a driving shaft,
(Continued)

wherein the perimetric frame and pole shoes are mutually distinct elements joined with fixing components.

11 Claims, 5 Drawing Sheets

(51) Int. Cl.
    *H02K 5/08*           (2006.01)
    *H02K 5/15*           (2006.01)
    *H02K 5/173*         (2006.01)
    *H02K 5/24*           (2006.01)
    *H02K 11/33*         (2016.01)

(52) U.S. Cl.
    CPC ............. *H02K 5/1735* (2013.01); *H02K 1/14* (2013.01); *H02K 3/52* (2013.01); *H02K 5/24* (2013.01); *H02K 11/33* (2016.01); *H02K 2203/12* (2013.01)

(56) References Cited

U.S. PATENT DOCUMENTS

| | | | | |
|---|---|---|---|---|
| 4,000,483 A * | 12/1976 | Cook | ................... | H01F 27/325 336/98 |
| 4,322,647 A * | 3/1982 | Neroda | ................ | H01R 4/2462 310/158 |
| 4,623,811 A * | 11/1986 | Nystuen | ................. | H02K 23/40 15/412 |
| 4,675,566 A * | 6/1987 | Nystuen | ................. | H02K 23/40 310/216.027 |
| 5,619,086 A * | 4/1997 | Steiner | ................ | H01F 41/0233 242/437.2 |
| 8,227,948 B1 * | 7/2012 | Fox | ........................ | H02K 1/06 310/50 |
| 2005/0280492 A1 * | 12/2005 | Kohno | .................. | H01F 27/326 336/208 |
| 2007/0205682 A1 * | 9/2007 | Choi | ..................... | D06F 37/304 310/114 |
| 2017/0276412 A1 * | 9/2017 | Li | ....................... | F04D 13/0633 |
| 2017/0294819 A1 * | 10/2017 | Crosby | .................. | H02K 1/185 |
| 2019/0052132 A1 * | 2/2019 | Ranalli | ................... | H02K 1/148 |
| 2019/0207437 A1 * | 7/2019 | Oshikiri | ............... | F04D 25/0633 |
| 2019/0356190 A1 * | 11/2019 | Kitta | ........................ | H02K 3/38 |

FOREIGN PATENT DOCUMENTS

| | | |
|---|---|---|
| EP | 2485367 A2 | 8/2012 |
| JP | 2002305851 A | 10/2002 |

OTHER PUBLICATIONS

Written Opinion dated Apr. 28, 2017 re: Application No. PCT/EP2017/053936, pp. 1-7.

* cited by examiner

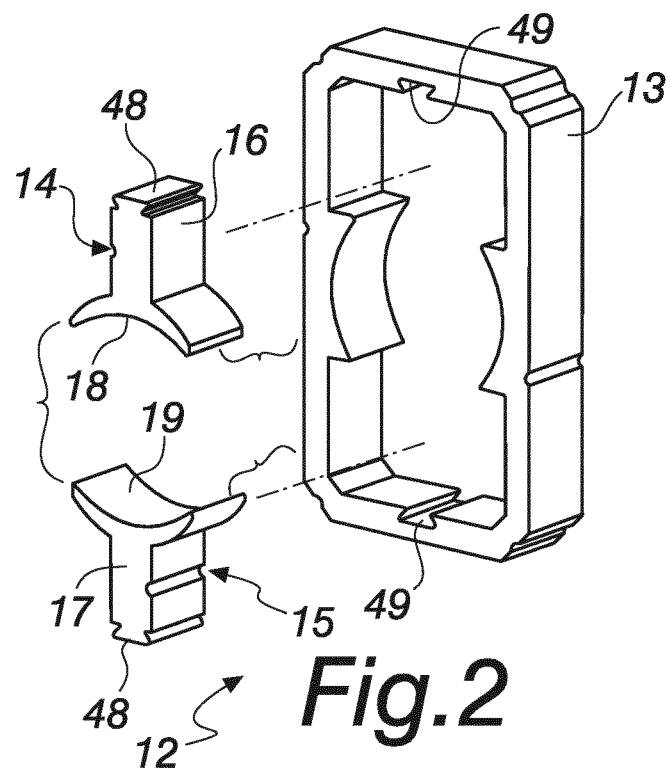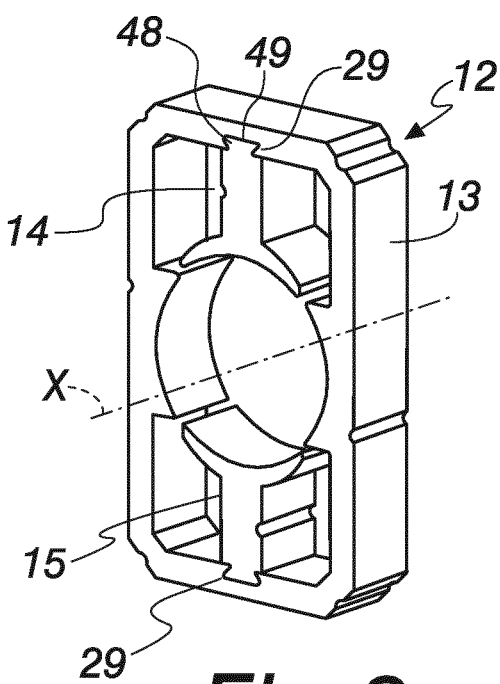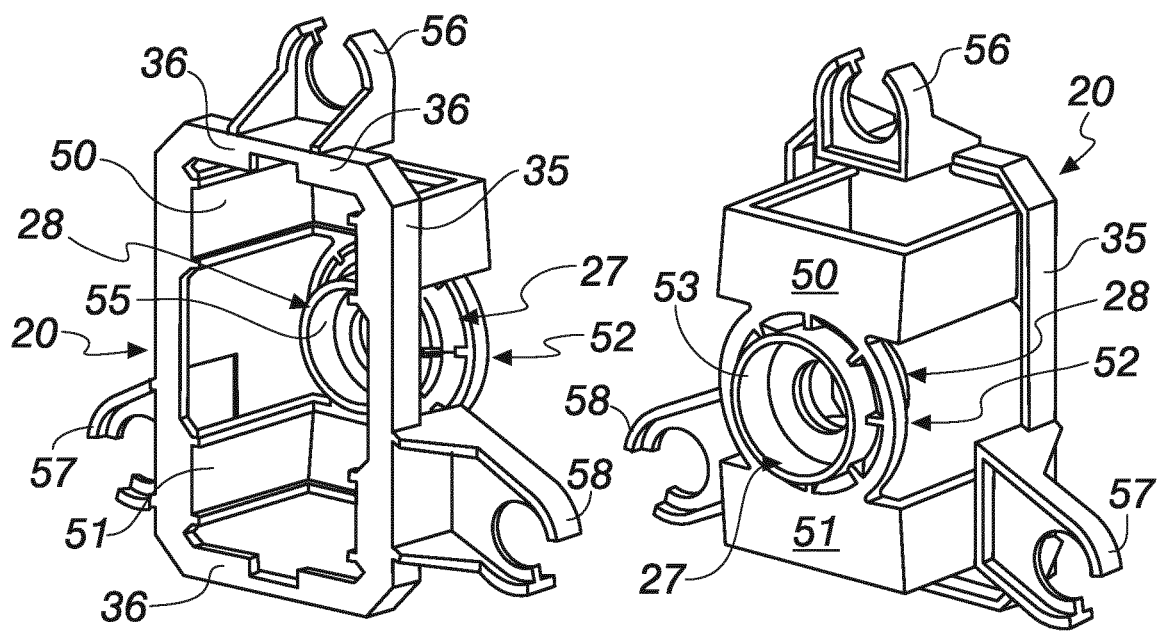

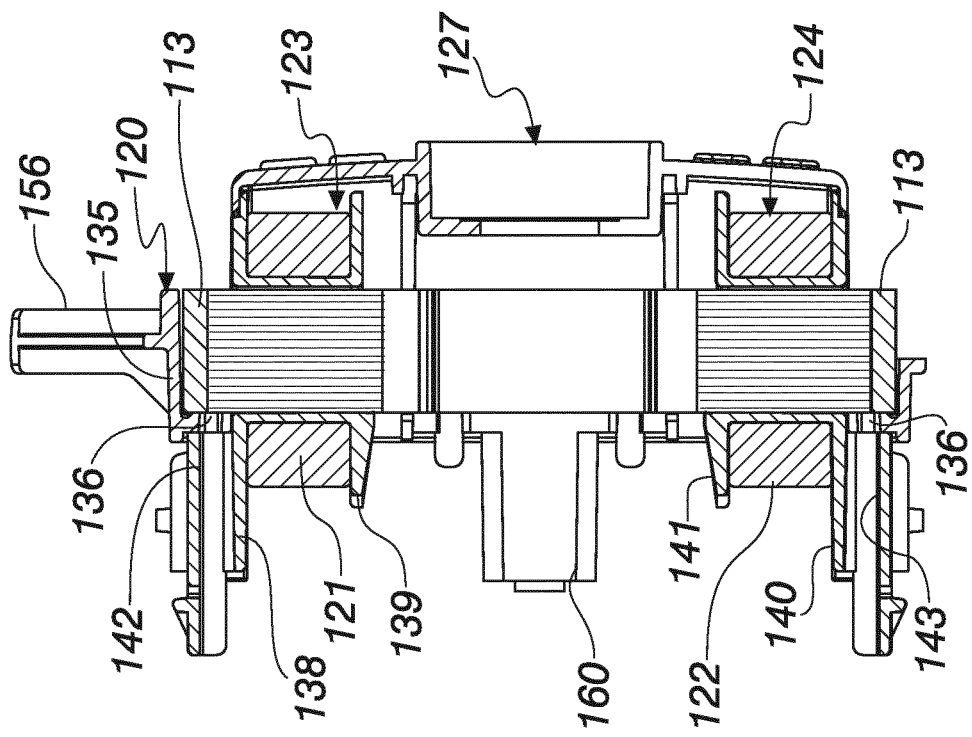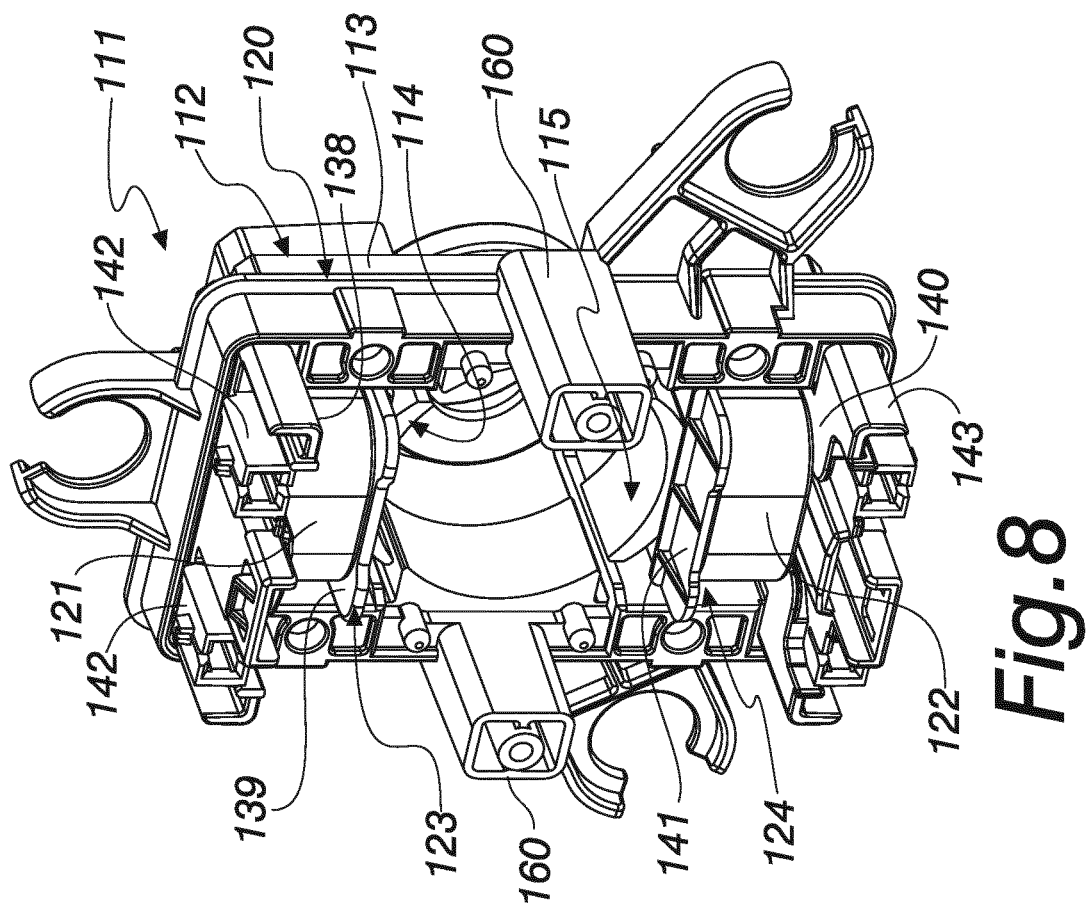

ELECTRIC MOTOR, IN PARTICULAR FOR FANS FOR COMBUSTION AIR, OR FOR AN AIR/COMBUSTION GAS MIXTURE, IN GAS BURNERS, STATOR ASSEMBLY FOR SUCH ELECTRIC MOTOR, AND METHOD OF ASSEMBLY FOR SUCH STATOR ASSEMBLY

TECHNICAL FIELD

The present disclosure relates to an electric motor, in particular for fans for combustion air, or for an air/combustion gas mixture, in gas burners.

BACKGROUND

Generally an electric motor, in particular a brushless motor, is composed of
 an annular stator pack inside which is defined at least one pair of pole shoes;
 a containment and supporting frame for the stator pack;
 a spool of conducting wire for each pole shoe, with the interposition of an insulating support, or more simply an insulator;
 a rotor, with driving shaft;
 a housing to contain and protect the stator pack, on which are defined the seats for the friction reduction means, i.e. bearings or bushings, for supporting the driving shaft of the rotor; such housing can be for example constituted by two mutually opposite covers, screwed to each other.

The supporting frame can have tabs which are contoured for the fixing of vibration damping elements that are adapted to be fixed in turn to a device to which the motor is intended to provide power or torque, for example to a propeller of a fan, the impeller of which is keyed on the driving shaft of the motor.

Such electric motors, although widespread and appreciated, have a number of drawbacks.

A first drawback is constituted by the fact that the operation for providing the windings of conducting wire around the pole shoes is laborious and as a consequence costly.

Such operation in fact entails first of all an operation for positioning the insulating supports, which are constituted by two mutually opposite annular half-shells, which are contoured so as to define, at and around each pole shoe, a spool for the winding of conducting wire, and then an operation for winding the conducting wire around the spools; such winding operation is particularly laborious and delicate because it is executed by way of a special winding machine with a needle guided around each pole shoe and arranged to move inside the assembly described up to this point, when already assembled.

Therefore the stator needs to be designed with a special shape, so that there is enough space to allow the guided needle to execute the movements necessary to provide the windings.

Such peculiarities therefore result in unavoidable constraints on the design of the stator and therefore of the motor overall.

Furthermore, nowadays it is common practice to install the electronic control card of the electric motor in a special compartment proximate to the electric motor proper, or even inside the actual containment body of the motor.

In this manner the card is positioned in an area where, owing to the heat developed by the motor, the temperature can be high, to the point that it induces malfunctions in the electronic card.

SUMMARY

The aim of the present disclosure is to provide an electric motor, in particular for fans for combustion air, or for an air/combustion gas mixture, in gas burners, that is capable of overcoming the above mentioned drawbacks of conventional electric motors.

Within this aim, the disclosure provides an electric motor that is simpler to install with respect to the above mentioned conventional motors.

The disclosure also provides an electric motor that is more compact.

The disclosure further provides an electric motor in which the definition of the stator windings is simpler.

The disclosure moreover provides an electric motor that permits greater freedom of design according to the technical needs of the maker.

The disclosure advantageously provides an electric motor that allows the installation inside it of the control electronics without risk of overheating for the latter.

The disclosure provides an electric motor that is easy to mount on a fan for combustion air in the manner of conventional electric motors.

This aim and these and other advantages which will become better evident hereinafter are achieved by providing an electric motor, in particular for fans for combustion air, or for an air/combustion gas mixture, in gas burners, by a stator assembly for such electric motor, and by a method of assembly for such stator assembly.

BRIEF DESCRIPTION OF THE DRAWINGS

Further characteristics and advantages of the disclosure will become better apparent from the description of two preferred, but not exclusive, embodiments of the electric motor according to the disclosure, which are illustrated for the purposes of non-limiting example in the accompanying drawings wherein:

FIG. 2 is an exploded perspective view of a detail of the motor of FIG. 1;

FIG. 3 is an assembled perspective view of the exploded view of FIG. 2;

FIG. 4 is a first perspective view of another detail of the first embodiment of the disclosure;

FIG. 5 is a second, different, perspective view of the detail of FIG. 4;

FIG. 8 is a perspective view of the assembled motor of FIG. 7;

FIG. 9 is a longitudinal cross-sectional view of the assembly of FIG. 8; and

DETAILED DESCRIPTION OF THE DRAWINGS

Figure 1:
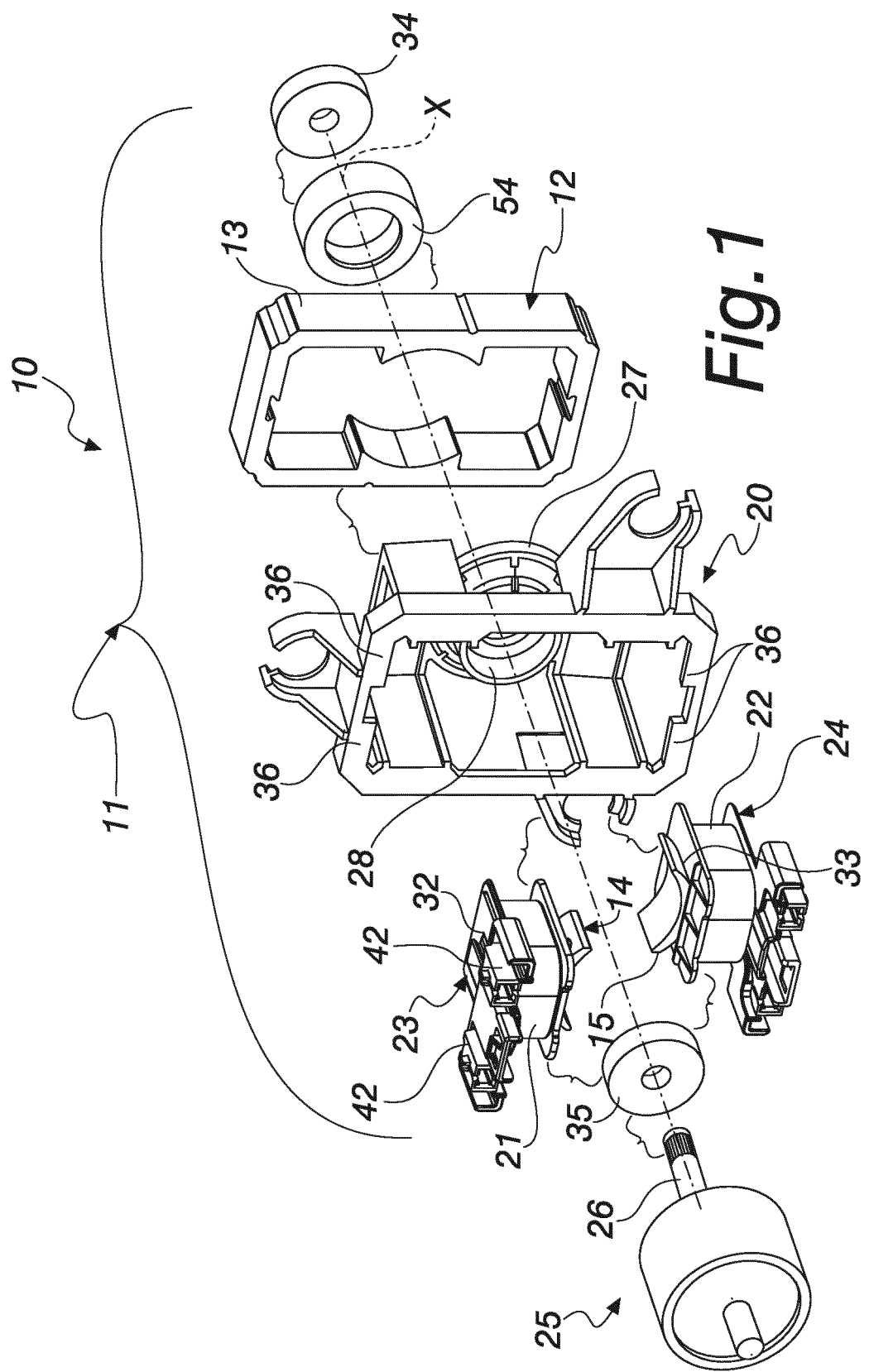
FIG. 1 is an exploded perspective view of an electric motor according to the disclosure, in a first embodiment thereof.

With reference to FIGS. 1-10, an electric motor according to the disclosure is generally designated in the first embodiment thereof with the reference numeral 10.

Such electric motor 10 is of the type comprising:
- a stator assembly 11, which in turn comprises:
  - a lamination pack 12 which is provided with a perimetric frame 13 with a pair of pole shoes 14, 15, each one of which is constituted by a winding body 16 and 17 respectively, and a widened head 18 and 19, shaped like a circular arc; the pole shoes are for example two in number but it should be understood that there can be a higher number of them according to technical and construction requirements;
  - a frame 20 for supporting the lamination pack 12,
  - a spool of conducting wire 21 and 22 respectively, shown in dotted lines in FIG. 1, for each pole shoe 14 and 15, with the interposition of an insulating support 23 and 24, or more simply an insulator,
  - means for reducing rotational friction, for the driving shaft 26 of a rotor 25, for example two bearings 34 and 35,
  - parts 27 and 28 for accommodating the means for reducing rotational friction, i.e. for such bearings 34 and 35;
- and a rotor 25, with a driving shaft 26.

Figure 6:
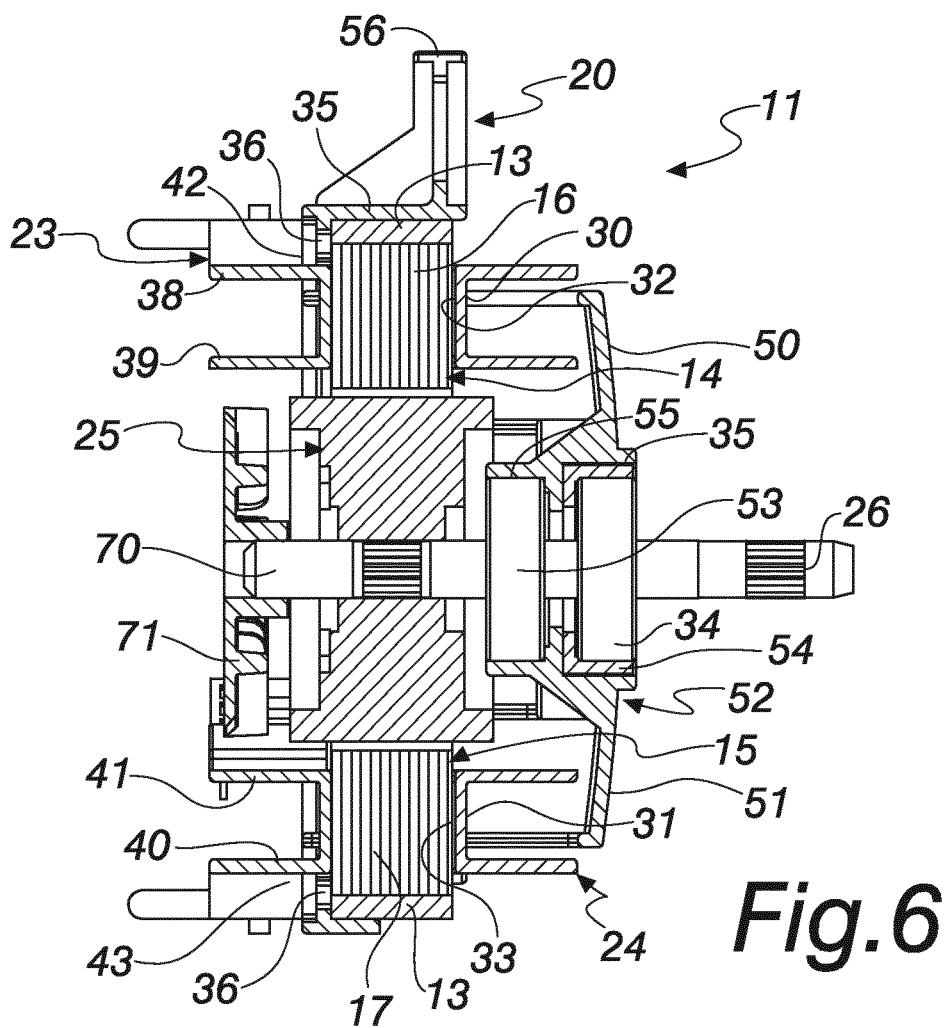
FIG. 6 is a longitudinal cross-sectional view of the assembled motor according to the disclosure, in the first embodiment thereof.

The peculiarity of the electric motor 10 according to the disclosure includes:
- the perimetric frame 13 and the pole shoes 14 and 15 are mutually distinct elements, as can clearly be seen in FIGS. 1, 2 and 3, and are joined with fixing means 29 which are better described hereinbelow for the purposes of example;
- each insulating support 23 and 24, as can clearly be seen in FIGS. 1 and 6, is constituted by an annular body 30 and 31 respectively, with a through axial opening 32 and 33, which is contoured to surround a corresponding winding body 16 and 17 of a pole shoe 14 and 15; and
- the supporting frame 20 for the lamination pack 12 is locked by interlocking, as described in more detail below, between the perimetric frame 13 of the pack 12 proper and the insulating supports 23 and 24.

In particular, in the present, non-limiting embodiment of the disclosure, the supporting frame 20, which can clearly be seen in FIGS. 4 and 5, comprises a perimetric wall 35 that is contoured to surround at least partly the external surface of the perimetric frame 13 of the lamination pack 12, one or more abutment shoulders 36 adapted to receive the perimetric frame 13 in abutment extending inward from this perimetric wall 35.

The insulating supports 23 and 24 are provided with corresponding containment shoulders 38, 39 and 40, 41 respectively for a corresponding spool of conducting wire 21 and 22; the external containment shoulders 38 and 40 respectively have extraction-preventing protrusions 42 and 43, which extend outward and are also intended to encounter the abutment shoulders 36 which on the opposite side are in abutment with the perimetric frame 13.

In this manner, by way of the abutment shoulders 36, the frame 20 is interlocked between the lamination pack 12 and the insulating supports 23 and 24, such insulating supports in turn being locked so as to surround the respective winding body 16 and 17 by virtue of the fixing of the respective winding body 16 and 17 to the perimetric frame 13.

The fixing means 29 of the pole shoes 14 and 15 to the perimetric frame 13 are in fact constituted, for each pole shoe, by a dovetail-shaped interlocking coupling, with dovetail-shaped tabs 48 and 49 extending from the winding body 16 and 17 and inserted, with movement in a direction X of assembly, into a complementarily shaped seat 49 defined inside the perimetric frame 13.

Advantageously, the supporting frame 20 integrates in a single piece the accommodation parts 27 and 28 for said means for reducing rotational friction.

In the present embodiment, obviously non-limiting, the supporting frame 20 is provided with two U-shaped brackets, respectively 50 and 51, which can clearly be seen in FIGS. 4 and 5, and which extend from the same side of the perimetric wall 35 and are arranged and contoured to receive the containment shoulders 38, 39, 40 and 41 of the corresponding insulating supports 23 and 24.

Defined between the two central parts of such U-shaped brackets 50 and 51 is a rotor-supporting portion 52, on which the accommodation parts 27 and 28 are provided; in particular a first accommodation part 27 has a first external seat 53 for a first bearing 34, optionally with the interposition of an elastic vibration damping element 54, and a second accommodation part 28 has a second internal seat 55 for a second bearing 35.

In such first embodiment, as can clearly be seen in FIG. 6, the driving shaft 26 is supported in a cantilever fashion on a same side with respect to the rotor 25; in this manner the other end 70 of the driving shaft 26 proper is free to be associated with another element, such as for example a fan 71, shown for the purposes of example in FIG. 6, for cooling an electronic control card which is mounted inside a same housing that contains the motor 10 according to the disclosure.

Such a technical solution makes it possible to provide a particularly compact motor without the cooling of the electronics being a problem for its operation.

The frame 20 comprises, in a single piece, the perimetric wall, the abutment shoulders 36, the U-shaped brackets 50 and 51, and the rotor-supporting portion 52.

The frame 20 is made by molding plastic material.

Advantageously, the supporting frame 20 is also provided, in a single piece, with lateral tabs 56, 57 and 58 which are contoured for the fixing of vibration damping elements, known as 'silent blocks', to be interposed for fixing the electric motor 10 to a body that carries it.

Such lateral tabs for fixing vibration damping elements are for example three in number, but it should be understood that there can be a higher number of them according to technical and construction requirements.

Figure 7:
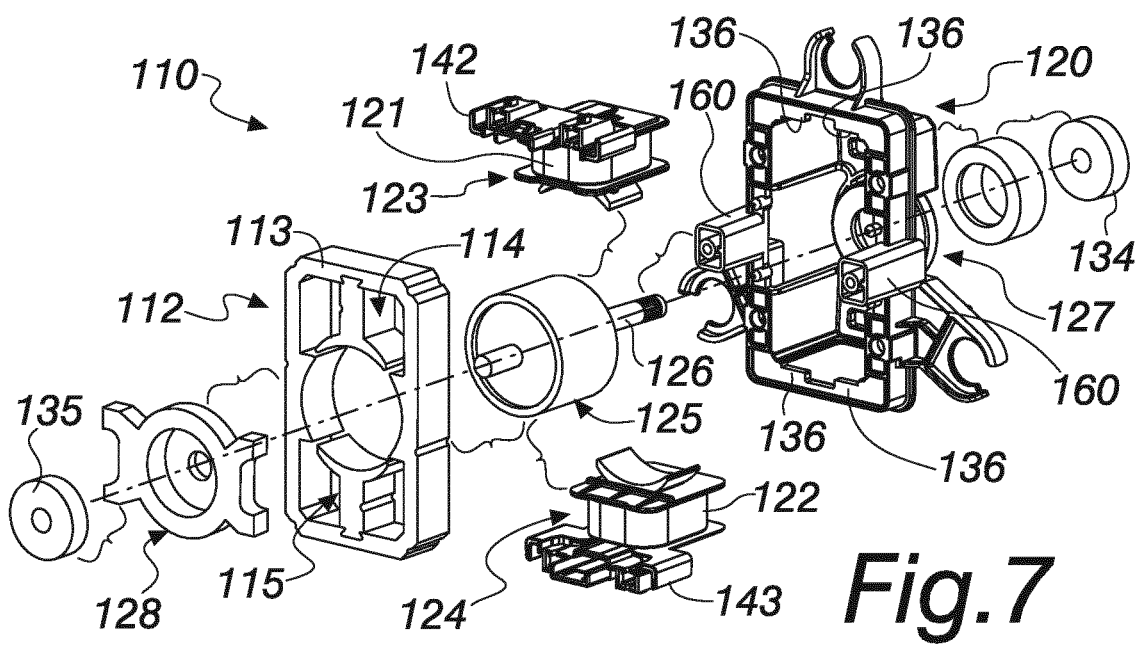
FIG. 7 is an exploded perspective view of the motor according to the disclosure, in a second embodiment thereof.

A second embodiment of the electric motor according to the disclosure is shown in FIGS. 7 to 9 and is generally designated therein with the reference numeral 110.

In such second embodiment of the disclosure, similarly to what is described above for the first embodiment, the electric motor 110 comprises a stator assembly 111, which in turn comprises:
- a lamination pack 112 composed of a perimetric frame 113 with a pair of pole shoes 114, 115 fixed thereto with fixing means as described above,
- a frame 120 for supporting the lamination pack 112,
- a spool of conducting wire 121 and 122 respectively, for each pole shoe 114 and 115, with the interposition of an insulating support 123 and 124,
- means for reducing rotational friction, for the driving shaft 126 of a rotor 125, for example two bearings 134 and 135,
- parts 127 and 128 for accommodating the means for reducing rotational friction, i.e. for such bearings 134 and 135.

It can clearly be seen in FIGS. 8 and 9 how the supporting frame 120 is locked by interlocking between the perimetric frame 113 of the pack 112 proper and the tabs 142 and 143 of the insulating supports 123 and 124.

In particular, the supporting frame 120 comprises a perimetric wall 135 that is contoured to surround at least partly the external surface of the perimetric frame 113 of the lamination pack 112, one or more abutment shoulders 136 adapted to receive the perimetric frame 113 in abutment extending inward from this perimetric wall 135.

The insulating supports 123, in FIGS. 8 and 9, and similarly 124, are provided with corresponding containment shoulders, for example 138 and 139 in FIG. 8, for a corresponding spool of conducting wire 121 and 122; the external containment shoulders 138 and 140 respectively have extraction-preventing protrusions 142 and 143, which extend outward and are also intended to encounter the abutment shoulders 136 which on the opposite side are in abutment with the perimetric frame 113.

In this manner, by way of the abutment shoulders 136, the frame 120 is interlocked between the lamination pack 112 and the insulating supports 123 and 124, said insulating supports in turn being locked so as to surround the respective winding body by virtue of to the fixing of the respective winding body to the perimetric frame 113, as described above.

In particular, in such second embodiment of the disclosure, the accommodation parts 127 and 128 for the means for reducing rotational friction are arranged opposite with respect to the rotor 125, a first part 127 integrated with the supporting frame 120 and a second part 128, clearly visible in FIG. 7, designed to be fixed to the frame 120 on the opposite side with respect to the first accommodation part 127; the fixing can be done for example by way of threaded connections, or with other similar and equivalent means.

An additional peculiarity of such second embodiment of the disclosure includes the supporting frame 120 being provided with support and fixing posts 160 for an electronic control card.

Figure 10:
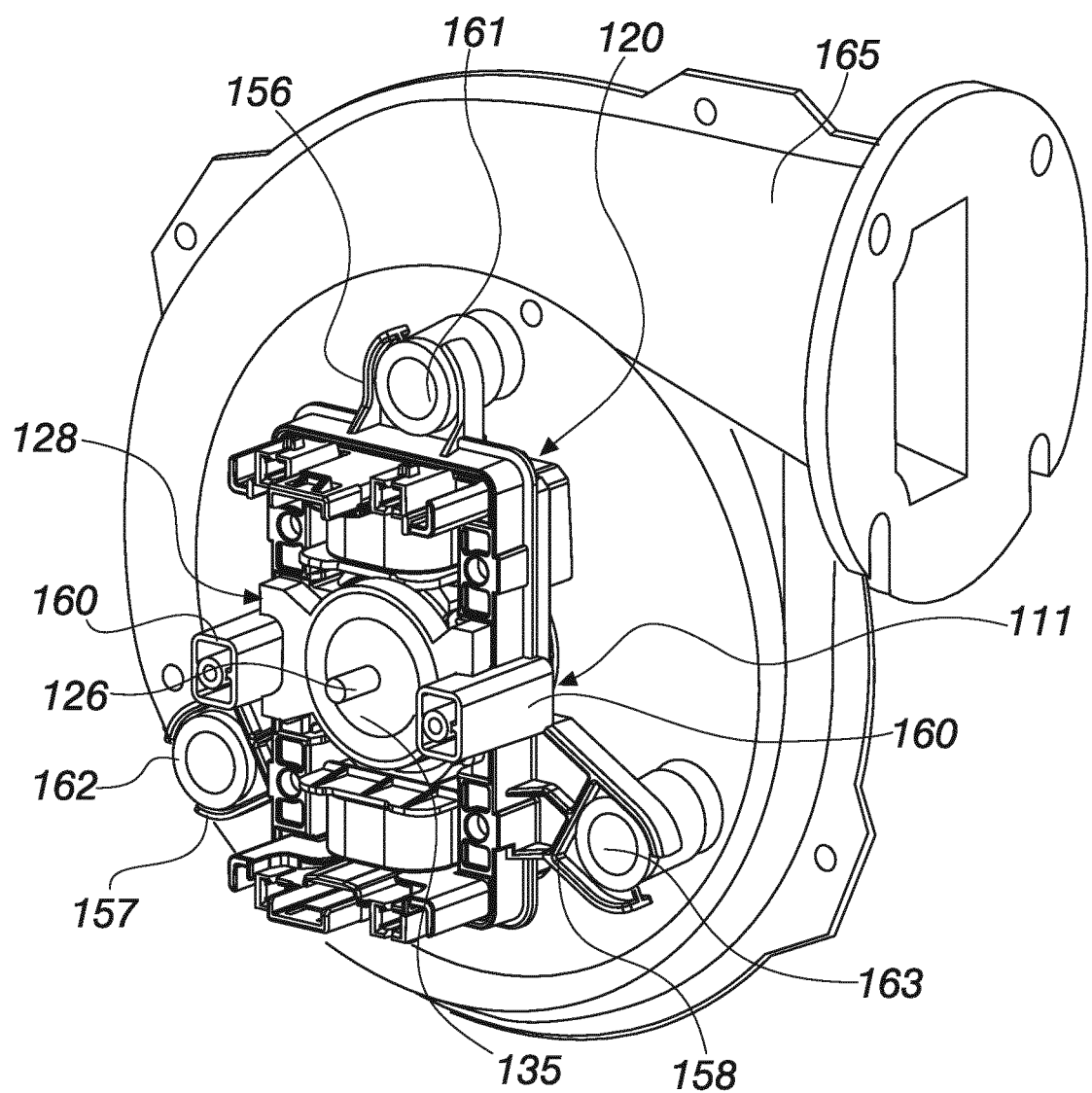
FIG. 10 is a perspective view of the motor according to the disclosure in the second embodiment thereof, installed on a fan for combustion air for burners.

The supporting frame 120 is also provided, in a single piece, with lateral tabs 156, 157 and 158 which are contoured for the fixing of vibration damping elements 161, 162 and 163, which can clearly be seen in the example of application in FIG. 10, to be interposed for fixing the electric motor 110 to a body that carries it, for example a propeller 165 of a fan.

It should be understood that the present disclosure also relates to a stator assembly 11 as described above, i.e. that comprises:
  a lamination pack 12 which is provided with a perimetric frame 13 with at least one pair of pole shoes 14, 15, each one of which is constituted by a winding body 16, 17 and a widened head 18, 19,
  a frame 20 for supporting the lamination pack 12,
  a spool of conducting wire 21, 22 for each pole shoe 14, 15, with the interposition of an insulating support 23, 24,
  means for reducing rotational friction, for the driving shaft of a rotor,
  accommodation parts 27, 28 for said means for reducing rotational friction.

Such stator assembly 11 is characterized in that:
  the perimetric frame 13 and the pole shoes 14 and 15 are mutually distinct elements joined with fixing means 29;
  each insulating support 23, 24 is constituted by an annular body 30, 31 with a through axial opening 32, 33 which is contoured to surround a corresponding winding body 16, 17;
  the supporting frame 20 for the lamination pack 12 is locked by interlocking between the perimetric frame 13 of the pack 12 proper and the insulating supports 23, 24.

The disclosure also relates to a method of assembly for such stator assembly 11.

Such method of assembly entails the following operations:
  providing the spools of conducting wire 21 and 22 on the respective insulating supports 23 and 24,
  coupling each insulating support 23 and 24 to a corresponding winding body 16 and 17 of a pole shoe 14 and 15,
  inserting the lamination pack 12 in abutment against the abutment shoulders 36 of the supporting frame 20,
  joining, by virtue of the fixing means 29, the pole shoes 14 and 15 to the perimetric frame 13 of the lamination pack 12.

Then the bearings, and any interposed elements for damping the gasket seals, and the rotor are assembled.

In practice it has been found that the disclosure fully achieves the intended aims and advantages.

In particular, with the disclosure an electric motor has been devised that is simpler to install with respect to the above mentioned conventional motors, by virtue of the smaller number of components and of the simple insertion and interlocking operations that are required; in particular the insulating supports are made from single annular bodies on which the spools can be provided with rapid operations, carried out with normal winding machines, when the insulating support is separate from the rest of the stator assembly and therefore without the space constraints typical of conventional motors.

What is more, with the disclosure an electric motor has been devised that is more compact, by virtue of the incorporation of the parts for accommodating the bearings in the frame proper, differently from conventional motors in which the bearings are accommodated in special covers or half-shells that are made especially and contoured to contain at least partly the lamination pack and the pole shoes.

Furthermore, with the disclosure an electric motor has been devised in which providing the stator windings is simpler, since, as explained above, it can be carried out with the insulating support separate from the stator assembly, therefore with more space available for the needle of the winding machine, and as a consequence faster.

Therefore an electric motor has been devised that permits greater freedom of design according to the technical needs of the maker, precisely by virtue of the fact that the design can disregard the spaces needed for the passage of a needle for winding, since the winding is carried out separately.

What is more, with the disclosure an electric motor has been devised that allows the installation inside it of the control electronics without risk of overheating for the latter, by virtue of the ability to support the rotor in a cantilever fashion and mount a fan for cooling the electronics on the free end of the driving shaft.

Also, with the disclosure an electric motor has been devised that is easy to mount on a fan for combustion air, as in conventional electric motors, by virtue of the lateral tabs, incorporated in the supporting frame for the lamination pack, which are contoured for the fixing of vibration damping elements to be interposed when fixing to such a fan.

The disclosure, thus conceived, is susceptible of numerous modifications and variations. Moreover, all the details may be substituted by other, technically equivalent elements.

In practice the components and the materials employed, provided they are compatible with the specific use, and the contingent dimensions and shapes, may be any according to requirements and to the state of the art.

The disclosures in Italian Patent Application No. 102016000017691 (UB2016A000930) from which this application claims priority are incorporated herein by reference.

The invention claimed is:

1. An electric motor, particularly for fans for combustion air, or for an air/combustion gas mixture, in gas burners, comprising:
   a stator assembly comprising:
      a lamination pack provided with a perimetric frame with at least one pair of pole shoes, each one of which is constituted by a winding body and a widened head,
      a frame for supporting the lamination pack,
      a spool of conducting wire for each pole shoe, with the interposition of an insulating support,
      means for reducing rotational friction, for the driving shaft of a rotor,
      accommodation parts for said means for reducing rotational friction;
   and a rotor, with a driving shaft;
      said perimetric frame and said pole shoes being mutually distinct elements joined with fixing means;
      each insulating support being constituted by an annular body with a through axial opening which is contoured to surround a corresponding winding body;
      said supporting frame for the lamination pack being locked by being trapped between said perimetric frame of said pack and said insulating supports;
   wherein said insulating supports are provided with corresponding containment shoulders for a corresponding spool of conducting wire, said external containment shoulders having extraction-preventing protrusions that extend outward and are intended to encounter the abutment shoulders, which on the opposite side are in abutment with the perimetric frame, said insulating supports being locked so as to surround the respective winding body by virtue of the fixing of the respective winding body to the perimetric frame.

2. The electric motor according to claim 1, wherein said supporting frame integrates in a single piece said accommodation parts for said means for reducing rotational friction.

3. The electric motor according to claim 1, wherein said supporting frame comprises a perimetric wall that is contoured to surround at least partly an external surface of the perimetric frame of the lamination pack, one or more abutment shoulders adapted to receive the perimetric frame in abutment extending inward from said perimetric wall.

4. The electric motor according to claim 1, wherein said means for fixing the pole shoes to the perimetric frame are constituted, for each pole shoe, by a dovetail-shaped interlocking coupling.

5. The electric motor according to claim 1, wherein said supporting frame is provided with two U-shaped brackets, which extend from a same side of the perimetric wall and are arranged and contoured so as to accommodate said containment shoulders of the corresponding insulating supports, a rotor-supporting portion being defined between two central parts of said U-shaped brackets, the accommodation parts being provided on said rotor-supporting portion.

6. The electric motor according to claim 1, wherein of said accommodation parts a first accommodation part has a first external seat for a first bearing, optionally with interposition of an elastic vibration damping element, and a second accommodation part, which has a second internal seat for a second bearing, said driving shaft being supported in a cantilever fashion on a same side with respect to the rotor.

7. The electric motor according to claim 1, wherein said supporting frame is provided in a single piece with lateral tabs contoured for the fixing of vibration damping elements.

8. The electric motor according to claim 1, wherein the accommodation parts for the means for reducing rotational friction are arranged opposite with respect to the rotor, a first part integrated with the supporting frame and a second part configured to be fixed to the frame on an opposite side with respect to the first accommodation part.

9. The electric motor according to claim 1, wherein said supporting frame is provided with support and fixing posts for an electronic control card.

10. A stator assembly for an electric motor, comprising:
   a lamination pack provided with a perimetric frame having at least one pair of pole shoes, each one of which is constituted by a winding body and a widened head,
   a frame for supporting the lamination pack,
   a spool of conducting wire for each pole shoe, with the interposition of an insulating support, means for reducing rotational friction, for the driving shaft of a rotor, and
   accommodation parts for said means for reducing rotational friction;
   wherein:
      said perimetric frame and said pole shoes are mutually distinct elements joined with fixing means;
      each insulating support being constituted by an annular body with a through axial opening which is contoured to surround a corresponding winding body;
      said supporting frame for the lamination pack being locked by being trapped between said perimetric frame of said pack and said insulating supports.

11. A method of assembly for a stator assembly according to claim 10, further comprising the following operations:
   providing the spools of conducting wire on the respective insulating supports,
   coupling each insulating support to a corresponding winding body of a pole shoe,
   inserting the lamination pack in abutment against abutment shoulders of the supporting frame, and
   joining, by virtue of the fixing means, the pole shoes to the perimetric frame of the lamination pack.

* * * * *